US008520868B2

(12) United States Patent
Jeong et al.

(10) Patent No.: US 8,520,868 B2
(45) Date of Patent: Aug. 27, 2013

(54) PIEZOELECTRIC MICRO SPEAKER AND METHOD OF MANUFACTURING THE SAME

(75) Inventors: Byung-gil Jeong, Anyang-si (KR); Seok-whan Chung, Suwon-si (KR); Dong-kyun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 589 days.

(21) Appl. No.: 12/699,278

(22) Filed: Feb. 3, 2010

(65) Prior Publication Data

US 2011/0038495 A1 Feb. 17, 2011

(30) Foreign Application Priority Data

Aug. 12, 2009 (KR) ........................ 10-2009-0074283

(51) Int. Cl.

| | |
|---|---|
| ***H04R 25/00*** | (2006.01) |
| ***H04R 31/00*** | (2006.01) |
| ***B05D 5/00*** | (2006.01) |
| ***B32B 37/00*** | (2006.01) |

(52) U.S. Cl.
USPC ............................ 381/190; 381/310; 427/100

(58) Field of Classification Search
USPC ................. 381/190, 360, 173, 150, 114, 310, 381/309
See application file for complete search history.

(56) References Cited

U.S. PATENT DOCUMENTS

| | | | | |
|---|---|---|---|---|
| 6,347,147 | B1 * | 2/2002 | Downs et al. | 381/114 |
| 7,003,125 | B2 | 2/2006 | Yi et al. | |
| 2003/0021458 | A1 * | 1/2003 | Hamada et al. | 382/135 |
| 2005/0095813 | A1 | 5/2005 | Zhu et al. | |
| 2007/0140514 | A1 * | 6/2007 | Pedersen | 381/150 |
| 2009/0147972 | A1 * | 6/2009 | Hwang | 381/190 |

FOREIGN PATENT DOCUMENTS

| | | | |
|---|---|---|---|
| JP | 2005-039720 | A | 2/2005 |
| JP | 2005-051688 | A | 2/2005 |
| JP | 2005-142623 | A | 6/2005 |
| JP | 2007-028671 | A | 2/2007 |
| KR | 10-2006-0099627 | A | 9/2006 |
| KR | 10-0737405 | B1 | 7/2007 |
| KR | 10-2008-0072329 | A | 8/2008 |

* cited by examiner

*Primary Examiner* — Duc Nguyen
*Assistant Examiner* — Phan Le
(74) *Attorney, Agent, or Firm* — Sughrue Mion, PLLC

(57) ABSTRACT

A piezoelectric micro speaker and a method of manufacturing the same are provided. The piezoelectric micro speaker includes a device plate, a front plate bonded on a front surface of the device plate, and a rear plate bonded on a rear surface of the device plate. The device plate includes a diaphragm, a piezoelectric actuator that vibrates the diaphragm, and a front cavity disposed in front of the diaphragm. The front plate includes a radiation hole connected to the front cavity. The rear plate includes a rear cavity formed in a surface of the rear plate facing the piezoelectric actuator, and a bent hole connected to the rear cavity. A sound absorption layer is formed on an inner surface of the rear cavity and absorbs sound radiated backward from the diaphragm so as to suppress the sound from being reflected on the rear plate.

7 Claims, 5 Drawing Sheets

PIEZOELECTRIC MICRO SPEAKER AND METHOD OF MANUFACTURING THE SAME

CROSS-REFERENCE TO RELATED APPLICATIONS

This application claims priority from Korean Patent Application No. 10-2009-0074283, filed on Aug. 12, 2009, in the Korean Intellectual Property Office, the disclosure of which is incorporated herein in its entirety by reference.

BACKGROUND

1. Field

One or more embodiments relate to a piezoelectric micro speaker and manufacturing a piezoelectric micro speaker.

2. Description of the Related Art

As terminals for personal voice communication and data communication are rapidly developed, the available amount of data to be transferred and received is continuously increasing, while the terminals are required to be small and multi-functional.

In order to satisfy this requirement, research has been recently conducted on an acoustic device using micro electro-mechanical system (MEMS) technology. In particular, a micro speaker using MEMS and semiconductor technologies allows a mass production of the micro speaker with a small size and low cost and is easily integrated with a peripheral circuit.

Micro speakers using MEMS technology are mainly classified as an electrostatic type, an electromagnetic type, and a piezoelectric type. In particular, a piezoelectric micro speaker may be driven by using a voltage that is lower than a voltage used in an electrostatic micro speaker and may be formed to be simpler and slimmer than an electromagnetic micro speaker.

A general piezoelectric micro speaker has a structure in which a piezoelectric actuator including a piezoelectric layer formed between two electrode layers is stacked on a surface of a diaphragm, and generates sound when a voltage is applied to the piezoelectric layer via the two electrode layers, deforming the piezoelectric layer, and thus vibrating the diaphragm.

A wiring process for applying a voltage and a packaging process for protecting the diaphragm are required to install the piezoelectric micro speaker in a system. In the packaging process, a front plate in which a radiation hole radiating sound is formed is bonded on a front surface of a device plate on which the diaphragm and the piezoelectric actuator are formed, and a rear plate in which a bent hole suppressing a vibration damping effect and tuning sound characteristics is formed is bonded on a rear surface of the device plate.

However, sound generated by vibrating the diaphragm is radiated forward and backward. The sound radiated backward is reflected forward by the rear plate due to an acoustic impedance difference. Due to an impedance difference between air and silicon (Si) forming the rear plate, most of the sound radiated backward is reflected. The reflected sound disturbs the vibration of the diaphragm and causes an interference having a phase difference from the sound radiated forward from the diaphragm, thereby reducing the sound pressure and distorting sound characteristics.

SUMMARY

One or more embodiments include a piezoelectric micro speaker capable of reducing the reflection of sound and a method of manufacturing the same.

According to an aspect of one or more embodiments, there is provided a piezoelectric micro speaker that includes: a device plate including a diaphragm, a piezoelectric actuator that vibrates the diaphragm, and a front cavity disposed in front of the diaphragm; a front plate bonded to a front surface of the device plate and including a radiation hole connected to the front cavity; and a rear plate bonded to a rear surface of the device plate and including a rear cavity formed in a surface of the rear plate facing the piezoelectric actuator, a bent hole connected to the rear cavity, and a sound absorption layer formed on an inner surface of the rear cavity and absorbing sound radiated backward from the diaphragm.

The sound absorption layer may be formed of a material having a lower acoustic impedance than that of silicon, for example, one selected from the group consisting of polyurethane foam, a polymer, and rubber.

A wiring layer may be formed on both surfaces of the rear plate, and the sound absorption layer may cover a portion of the wiring layer disposed in the rear cavity.

The piezoelectric micro speaker may be installed on a printed circuit board, and an auxiliary sound absorption layer that absorbs sound passed through the bent hole may be formed in a portion of the printed circuit board facing the bent hole.

According to an aspect of one or more embodiments, there is provided a method of manufacturing a piezoelectric micro speaker that includes: manufacturing a device plate including a diaphragm, a piezoelectric actuator that vibrates the diaphragm, and a front cavity disposed in front of the diaphragm; manufacturing a front plate comprising a radiation hole; manufacturing a rear plate including a rear cavity formed in a surface of the rear plate facing the piezoelectric actuator, a bent hole connected to the rear cavity, and a sound absorption layer formed on an inner surface of the rear cavity and absorbing sound radiated backward from the diaphragm; and bonding the device plate, the front plate, and the rear plate to each other.

The manufacturing of the device plate may include forming the diaphragm on a surface of a first substrate; forming the piezoelectric actuator by sequentially stacking a first electrode layer, a piezoelectric layer, and a second electrode layer on a surface of the diaphragm; and forming the front cavity by etching a portion of another surface of the first substrate until the diaphragm is exposed.

The manufacturing of the rear plate may include forming the rear cavity by etching a surface of a second substrate; forming the bent hole by etching a bottom surface of the rear cavity so as to penetrate the second substrate; and forming the sound absorption layer on the inner surface of the rear cavity.

The sound absorption layer may be formed of a material having a lower acoustic impedance than that of silicon, for example, one selected from the group consisting of polyurethane foam, a polymer, and rubber. Also, the sound absorption layer may be formed by coating a material by using a deposition or lamination method and then patterning the material.

The manufacturing of the rear plate may further include forming a first wiring layer on the surface of the second substrate and the inner surface of the rear cavity; forming penetrating holes in the second substrate by etching another surface of the second substrate; forming connection wires respectively in the penetrating holes by filling the penetrating holes with a conductive metallic material; and forming a second wiring layer on the other surface of the second substrate. In this case, the sound absorption layer may cover a portion of the first wiring layer disposed in the rear cavity.

The bonding of the device plate, the front plate, and the rear plate may include bonding the rear plate on a rear surface of the device plate such that the piezoelectric actuator and the rear cavity face each other; and bonding the front plate on a front surface of the device plate such that the front cavity and the radiation hole are connected to each other.

The device plate may be bonded to the front plate by using a polymer bonding method, and the device plate may be bonded to the rear plate by using a eutectic bonding method using a wafer bond formed of a conductive metallic compound.

BRIEF DESCRIPTION OF THE DRAWINGS

The above and/or other aspects will become apparent and more readily appreciated from the following description of the embodiments, taken in conjunction with the accompanying drawings of which.

DETAILED DESCRIPTION

Figure 1:
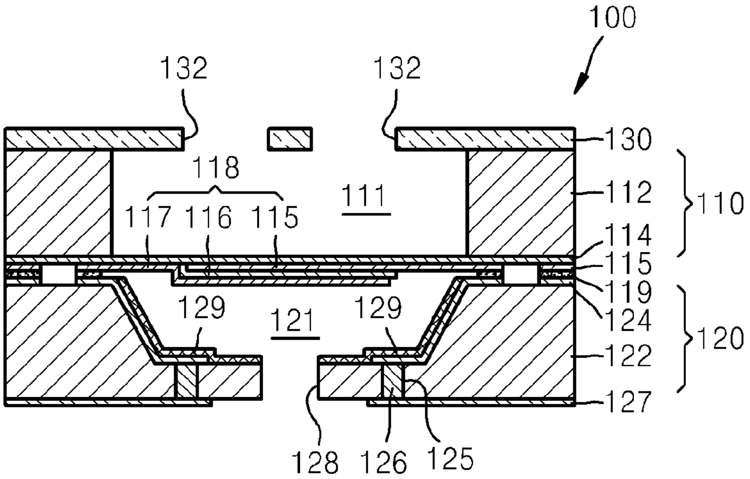
FIG. 1 is a cross-sectional diagram of a piezoelectric micro speaker, according to an embodiment.

Reference will now be made in detail to embodiments, examples of which are illustrated in the accompanying drawings, wherein like reference numerals refer to the like elements throughout. In this regard, the embodiments may have different forms and should not be construed as being limited to the descriptions set forth herein. Accordingly, the embodiments are merely described below, by referring to the figures, to explain aspects of the present description.

FIG. 1 is a cross-sectional diagram of a piezoelectric micro speaker 100, according to an embodiment.

Referring to FIG. 1, the piezoelectric micro speaker 100 includes a device plate 110 in which a diaphragm 114 and a piezoelectric actuator 118 are formed, a rear plate 120 bonded on a rear surface of the device plate 110 and having a bent hole 128 tuning sound characteristics, and a front plate 130 bonded on a front surface of the device plate 110 and having a radiation hole 132 radiating sound. A rear cavity 121 ensuring a vibration space of the diaphragm 114 and the piezoelectric actuator 118, and the bent hole 128 suppressing a vibration damping effect and tuning sound characteristics are formed in the rear plate 120. A sound absorption layer 129, absorbing sound radiated backward from the diaphragm 114, is formed on an inner surface of the rear cavity 121.

In more detail, the device plate 110 includes a first substrate 112, the diaphragm 114 formed on a surface of the first substrate 112 to have a predetermined thickness, and the piezoelectric actuator 118 including a first electrode layer 115, a piezoelectric layer 116, and a second electrode layer 117 sequentially stacked on a surface of the diaphragm 114. The first substrate 112 may be formed as an Si wafer, and the diaphragm 114 may be formed by depositing Si nitride such as $Si_3N_4$ on the surface of the first substrate 112 to have a predetermined thickness. The first and second electrode layers 115 and 117 may be formed of a conductive metallic material, and the piezoelectric layer 116 may be formed of a piezoelectric material such as a zinc oxide (ZnO) ceramic material.

A front cavity 111 is formed in the first substrate 112 of the device plate 110. The front cavity 111 allows the diaphragm 114 and the piezoelectric actuator 118 to vibrate and is a space located in front of the diaphragm 114 in order to radiate sound generated due to vibration of the diaphragm 114.

In the device plate 110, if a predetermined voltage is applied to the piezoelectric layer 116 via the first and second electrode layers 115 and 117, the piezoelectric layer 116 is deformed and thus the diaphragm 114 vibrates. Due to the vibration of the diaphragm 114, sound is generated and the generated sound is radiated backward through the rear cavity 121 as well as forward through the front cavity 111. The radiation of the sound will be described in detail later.

The front plate 130 is bonded on the front surface of the device plate 110 and may be formed as an Si wafer. The radiation hole 132, capable of radiating sound, is formed in the front plate 130 so as to be connected to the front cavity 111 formed in the device plate 110. Thus, the device plate 110 is disposed between the front plate 130 and the rear plate 120 so that the front cavity 111 and the rear cavity 121 are axially aligned with the piezoelectric actuator 118 disposed therebetween.

The rear plate 120 includes a second substrate 122, the rear cavity 121 formed to a predetermined depth from a surface of the second substrate 122 facing the piezoelectric actuator 118, the bent hole 128 connected to the rear cavity 121 and penetrating the second substrate 122, first and second wiring layers 124 and 127 separately formed on both surfaces of the second substrate 122, and connection wires 126 electrically connecting the first and second wiring layers 124 and 127. Penetrating holes 125 are formed in a portion of the second substrate 122, which is thin due to the rear cavity 121, and the connection wires 126 are formed in the penetrating holes 125. The second substrate 122 may be formed as an Si wafer. The first and second wiring layers 124 and 127 may be formed of a conductive metallic material such as chrome (Cr) and/or gold (Au). The connection wires 126 may also be formed of a conductive metallic material such as copper (Cu). Each of the first and second wiring layers 124 and 127 may be formed as a double layer in which Cr and Au are stacked on one another.

The rear cavity 121 is a vibration space of the diaphragm 114 and the piezoelectric actuator 118. The sound absorption layer 129, for absorbing sound radiated backward from the diaphragm 114, is formed on the inner surface of the rear cavity 121. That is, the sound absorption layer 129 is disposed to face the piezoelectric actuator 118. A portion of the sound absorption layer 129 may cover a portion of the first wiring layer 124 disposed in the rear cavity 121. A portion of the sound absorption layer 129 may cover a portion of the inner surface of the rear cavity 121 that does not include the first wiring layer 124 disposed thereon.

The sound absorption layer 129 may be formed of a material having a lower acoustic impedance than that of Si forming the second substrate 122. Acoustic impedance is the multiplication of the density of a medium and the speed of sound proceeding in the medium. When sound proceeding in the air meets another medium, as the acoustic impedance of the medium is similar to that of the air, the sound is reflected less on the medium. However, since the acoustic impedance of Si is greater than that of the air, in order to reduce sound reflection, the sound absorption layer 129 may be formed of a material having an acoustic impedance lower than that of Si by as much as possible. Accordingly, the sound absorption layer 129 may be formed of a material having a relatively low density and sound proceeding speed, e.g., a porous soft material such as polyurethane foam, a polymer, or rubber, or any mixtures thereof.

The rear plate 120 is bonded on the rear surface of the device plate 110. The rear plate 120 may be bonded to the device plate 110 by using a wafer bond 119 disposed therebetween, and the wafer bond 119 may be formed of a conductive metallic compound in order to electrically connect the first and second electrode layers 115 and 117 of the device plate 110 to the first wiring layer 124 of the rear plate 120.

In the above-described piezoelectric micro speaker 100, sound reflection may be reduced by forming the sound absorption layer 129 on a surface of the rear plate 120 reflecting sound. Accordingly, vibration interference of the diaphragm 114 due to reflected sound may be suppressed so as to improve the pressure of sound radiating forward from the diaphragm 114. Also, mutual interference due to a phase difference between the reflected sound and the sound radiating forward may be suppressed so as to reduce the total harmonic distortion (THD) of the sound radiating forward.

Figure 2:
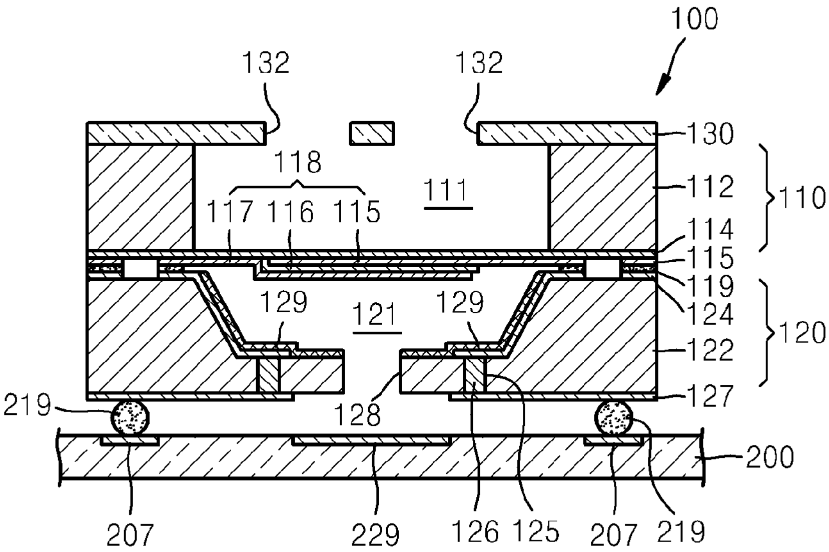
FIG. 2 is a cross-sectional diagram when the piezoelectric micro speaker illustrated in FIG. 1 is installed on a printed circuit board of a system, according to an embodiment.

FIG. 2 is a cross-sectional diagram of the piezoelectric micro speaker 100 illustrated in FIG. 1 installed on a printed circuit board 200 of a system, according to an embodiment.

Referring to FIG. 2, the piezoelectric micro speaker 100 is installed on the printed circuit board 200 of a system such as a mobile phone. A driving circuit 207 is formed in or on the printed circuit board 200 to drive the piezoelectric micro speaker 100, and may be electrically connected via solder balls 219 to the second wiring layer 127 formed on the rear plate 120 of the piezoelectric micro speaker 100.

An auxiliary sound absorption layer 229 may be formed in or on a portion of the printed circuit board 200 facing the bent hole 128 formed in the rear plate 120 of the piezoelectric micro speaker 100. The auxiliary sound absorption layer 229 may absorb sound passed through the bent hole 128 so as to suppress the sound from being reflected on the printed circuit board 200, thereby additionally reducing the THD of the sound.

A method of manufacturing the piezoelectric micro speaker 100 will now be described step-by-step.

FIGS. 3A through 3D are cross-sectional diagrams for describing a process of manufacturing the device plate 110 of the piezoelectric micro speaker 100 illustrated in FIG. 1, according to an embodiment.

Figure 3A:
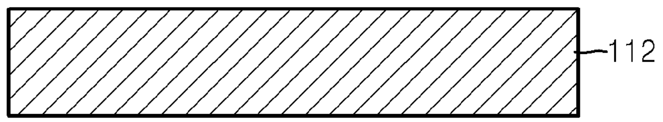
FIGS. 3A through 3D are cross-sectional diagrams for describing a process of manufacturing a device plate of the piezoelectric micro speaker illustrated in FIG. 1, according to an embodiment.

Initially, referring to FIG. 3A, the first substrate 112 is prepared. An Si wafer may be used as the first substrate 112.

Figure 3B:
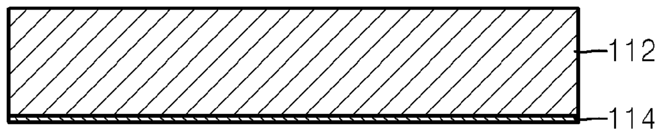

Then, as illustrated in FIG. 3B, the diaphragm 114 is formed on a surface of the first substrate 112 to have a predetermined thickness. The diaphragm 114 may be formed by depositing Si nitride such as $Si_3N_4$ on the surface of the first substrate 112.

Figure 3C:
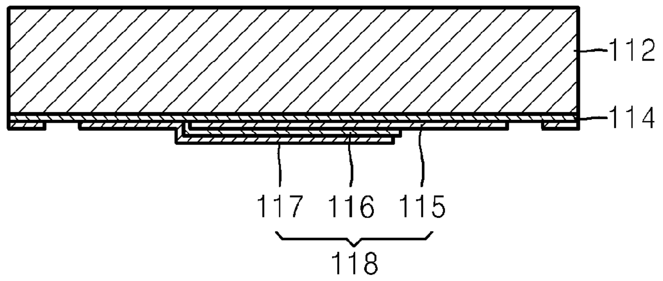

Then, as illustrated in FIG. 3C, the piezoelectric actuator 118 is formed by sequentially stacking the first electrode layer 115, the piezoelectric layer 116, and the second electrode layer 117 on a surface of the diaphragm 114. The first and second electrode layers 115 and 117 may be formed of a conductive metallic material, and the piezoelectric layer 116 may be formed of a piezoelectric material such as a ZnO ceramic material.

Figure 3D:
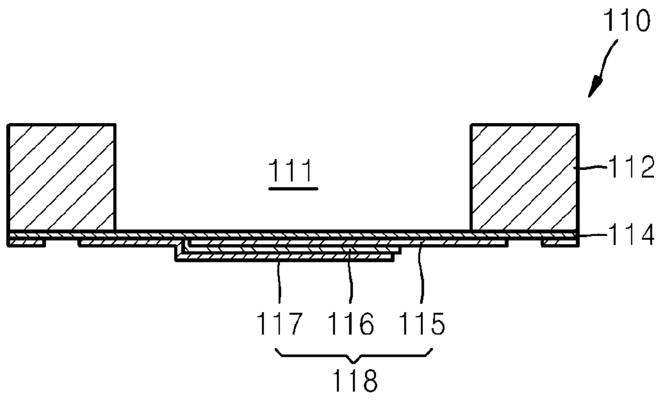

Then, as illustrated in FIG. 3D, the front cavity 111 is formed in the first substrate 112 by etching a portion of another surface of the first substrate 112 until the diaphragm 114 is exposed.

Accordingly, the device plate 110 is formed which includes the diaphragm 114, the piezoelectric actuator 118, and the front cavity 111.

FIGS. 4A through 4F are cross-sectional diagrams for describing a process of manufacturing the rear plate 120 of the piezoelectric micro speaker 100 illustrated in FIG. 1, according to an embodiment.

Figure 4A:
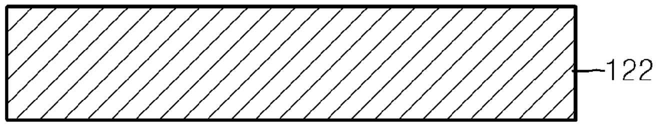
FIGS. 4A through 4F are cross-sectional diagrams for describing a process of manufacturing a rear plate of the piezoelectric micro speaker illustrated in FIG. 1, according to an embodiment.

Initially, referring to FIG. 4A, the second substrate 122 is prepared. An Si wafer may be used as the second substrate 122.

Figure 4B:
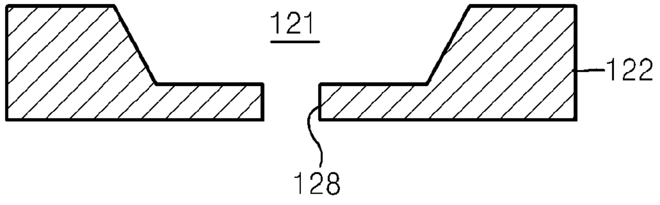

Then, as illustrated in FIG. 4B, the rear cavity 121 is formed in the second substrate 122 by etching a surface, such as a top surface, of the second substrate 122 to a predetermined depth, and then the bent hole 128 is formed by etching a bottom surface of the rear cavity 121 to penetrate the second substrate 122. The rear cavity 121 and the bent hole 128 may be formed by dry or wet etching the second substrate 122.

Figure 4C:
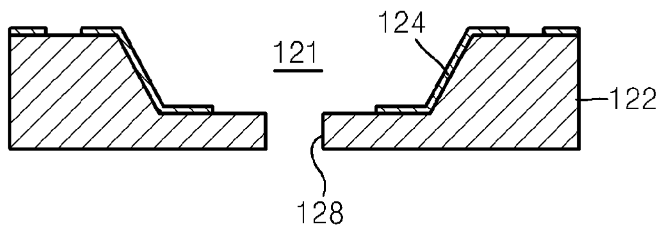

Then, as illustrated in FIG. 4C, the first wiring layer 124 is formed on the surface of the second substrate 122 and an inner surface of the rear cavity 121. The first wiring layer 124 may be formed by depositing a conductive metallic material such as Cr and/or Au by using an evaporation or sputtering method, and then, patterning the conductive metallic material. The first wiring layer 124 may be formed as a double layer in which Cr and Au are stacked on one another.

Figure 4D:
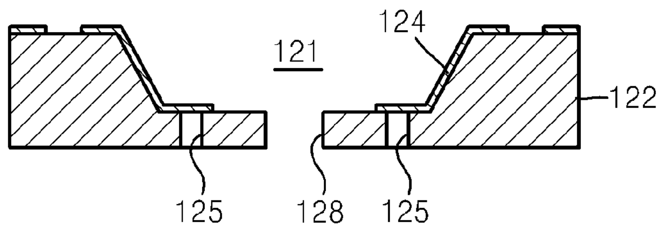

Then, as illustrated in FIG. 4D, the penetrating holes 125 are formed in the second substrate 122 by etching another surface, such as the bottom surface, of the second substrate 122 until the first wiring layer 124 is exposed. The penetrating holes 125 may be formed in a portion of the second substrate 122, which is thin due to the formation of the rear cavity 121.

Figure 4E:
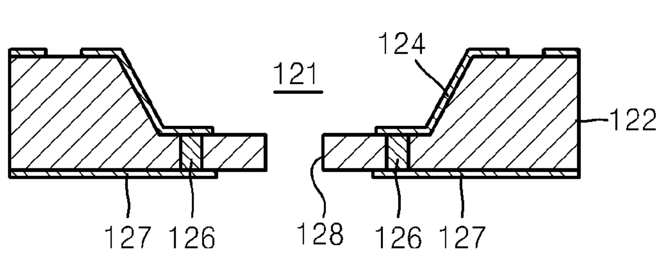

Then, as illustrated in FIG. 4E, the connection wires 126 are formed by filling the penetrating holes 125 with a conductive metallic material such as Cu, and then the second wiring layer 127 is formed on the other surface, such as the bottom surface, of the second substrate 122. The connection wires 126 may be formed by using an electro-plating method, and the second wiring layer 127 may be formed by using the same method used to form the first wiring layer 124.

Figure 4F:
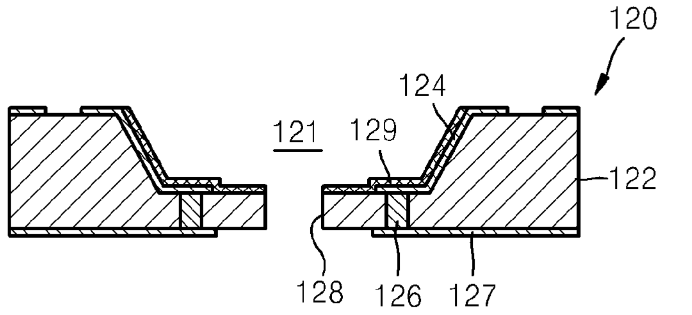

Then, as illustrated in FIG. 4F, the sound absorption layer 129 is formed on the inner surface of the rear cavity 121. The sound absorption layer 129 may cover at least a portion of the first wiring layer 124 disposed in the rear cavity 121. As described above in relation to FIG. 1, the sound absorption layer 129 may be formed by coating a material having a lower acoustic impedance than that of Si, e.g., a porous soft material such as polyurethane foam, a polymer, or rubber, by using a deposition or lamination method and then patterning the material.

Accordingly, the rear plate 120 is formed which includes the rear cavity 121, the bent hole 128, the first wiring layer 124, the second wiring layer 127, and the sound absorption layer 129.

Figure 5:
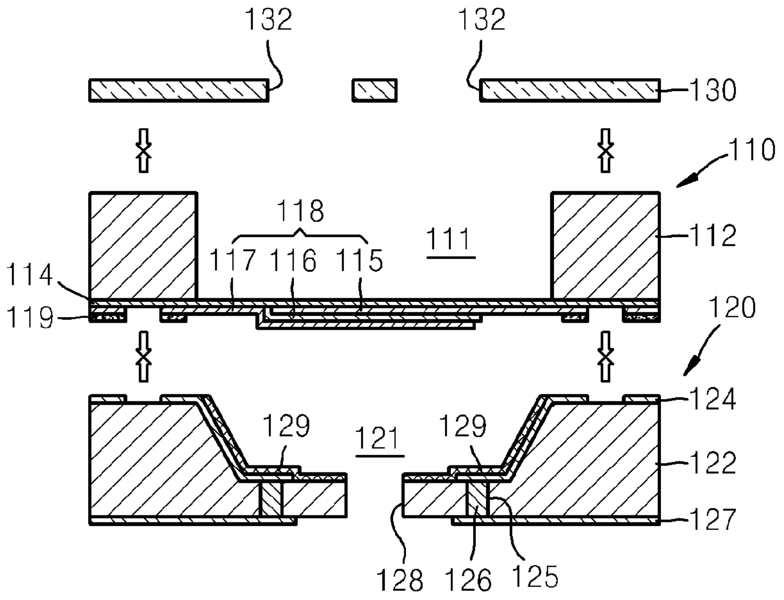
FIG. 5 is a cross-sectional diagram for describing a process of completely forming the piezoelectric micro speaker illustrated in FIG. 1 by bonding the device plate illustrated in FIG. 3D, the rear plate illustrated in FIG. 4F, and a front plate, according to an embodiment.

FIG. 5 is a cross-sectional diagram for describing a process of completely forming the piezoelectric micro speaker 100 illustrated in FIG. 1 by bonding the device plate 110 illustrated in FIG. 3D, the rear plate 120 illustrated in FIG. 4F, and the front plate 130, according to an embodiment.

Referring to FIG. 5, the front plate 130 may be formed by etching an Si wafer so as to form the radiation hole 132 in the Si wafer.

The rear plate 120 is bonded on a rear surface of the device plate 110. In this case, the piezoelectric actuator 118 and the rear cavity 121 face each other. Then, the front plate 130 is bonded on a front surface of the device plate 110. In this case, the front cavity 111 and the radiation hole 132 are connected to each other. The rear plate 120 may be bonded to the device plate 110 by using a eutectic bonding method using the wafer bond 119 disposed therebetween. The wafer bond 119 may be formed of a conductive metallic compound in order to electrically connect the first and second electrode layers 115 and 117 of the device plate 110 to the first wiring layer 124 of the rear plate 120. The front plate 130 may be bonded to the device plate 110 using, for example, a polymer bonding method.

If the device plate 110, the front plate 130, and the rear plate 120 are bonded to each other as described above, the piezoelectric micro speaker 100 illustrated in FIG. 1 is completely formed.

Then, as illustrated in FIG. 2, when the piezoelectric micro speaker 100 is installed on the printed circuit board 200 of a system, the auxiliary sound absorption layer 229 may be formed in a portion of the printed circuit board 200 facing the bent hole 128 formed in the rear plate 120 of the piezoelectric micro speaker 100.

As described above, according to the one or more of the above embodiments, sound reflection may be reduced by forming a sound absorption layer on a surface of a rear plate that reflects sound. Accordingly, vibration interference of a diaphragm due to reflected sound may be suppressed so as to improve the pressure of sound radiating forward from the diaphragm. Also, mutual interference due to a phase difference between the reflected sound and the sound radiating forward may be suppressed so as to reduce the THD of the sound radiating forward.

It should be understood that the embodiments described herein should be considered in a descriptive sense only and not for purposes of limitation. Descriptions of features or aspects within each embodiment should typically be considered as available for other similar features or aspects in other embodiments.

What is claimed is:

1. A piezoelectric micro speaker comprising:

a device plate comprising a diaphragm, a piezoelectric actuator that vibrates the diaphragm, and a front cavity disposed in front of the diaphragm;

a front plate which is disposed on a front surface of the device plate, the front plate comprising a radiation hole connected to the front cavity; and a rear plate which is disposed on a rear surface of the device plate, the rear plate comprising:

a rear cavity which is formed in a surface of the rear plate facing the piezoelectric actuator, a bent hole which is connected to the rear cavity, a sound absorption layer which is disposed on an inner surface of the rear cavity and absorbs sound radiated backward from the diaphragm, and a wiring layer formed on the surface of the rear plate facing the piezoelectric actuator, wherein the sound absorption layer covers at least a portion of the wiring layer disposed in the rear cavity of the rear plate.

2. The piezoelectric micro speaker of claim 1, wherein the sound absorption layer is formed of a material having a lower acoustic impedance than that of silicon.

3. The piezoelectric micro speaker of claim 2, wherein the sound absorption layer is formed of one selected from the group consisting of a polyurethane foam, a polymer, a rubber, and any mixtures thereof.

4. The piezoelectric micro speaker of claim 1, wherein the piezoelectric micro speaker is installed on a printed circuit board, and wherein an auxiliary sound absorption layer that absorbs sound passed through the bent hole is formed in a portion of the printed circuit board facing the bent hole.

5. The piezoelectric micro speaker of claim 1, further comprising:

a first wiring layer formed on the inner surface of the rear cavity;

a second wiring layer formed on a bottom surface of the rear plate; and at least one connection wire connecting the first and second wiring layers via at least one penetrating hole formed in the rear plate.

6. The piezoelectric micro speaker of claim 5, wherein the sound absorption layer is disposed directly on both the first wiring layer and a portion of the inner surface of the rear cavity not having the first wiring layer formed thereon.

7. The piezoelectric micro speaker of claim 6, wherein the device plate is disposed between the front plate and the rear plate so that the front cavity and the rear cavity are axially aligned with the piezoelectric actuator disposed therebetween.

* * * * *